Figure 3:
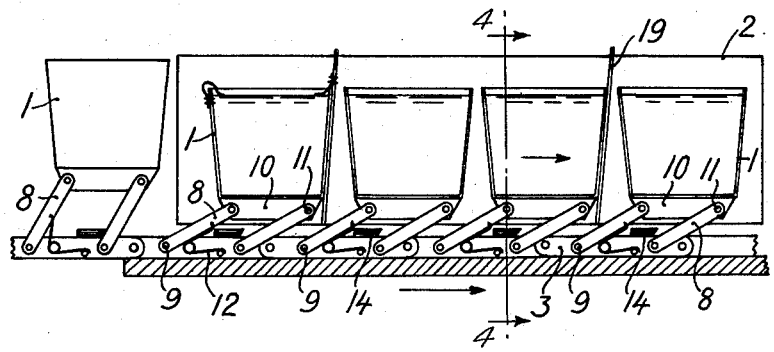

Nov. 21, 1950  T. W. THARALDSEN  2,531,087
FREEZING APPARATUS
Filed March 27, 1947  3 Sheets-Sheet 1
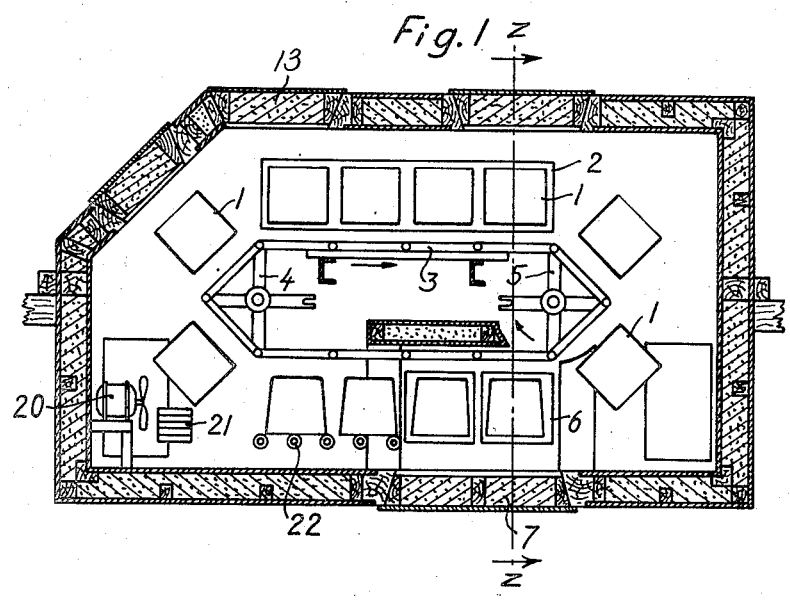
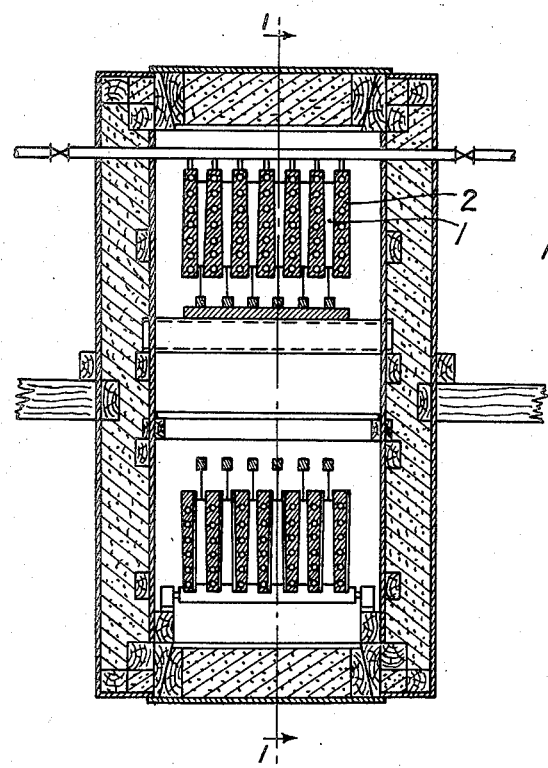
INVENTOR
T. W. Tharaldsen
By Watson, Cole, Grindle & Watson Nov. 21, 1950 T. W. THARALDSEN 2,531,087
FREEZING APPARATUS
Filed March 27, 1947 3 Sheets-Sheet 2

INVENTOR
T. W. Tharaldsen
By Watson, Cole, Grindle
& Watson

Nov. 21, 1950 T. W. THARALDSEN 2,531,087
FREEZING APPARATUS
Filed March 27, 1947 3 Sheets-Sheet 3
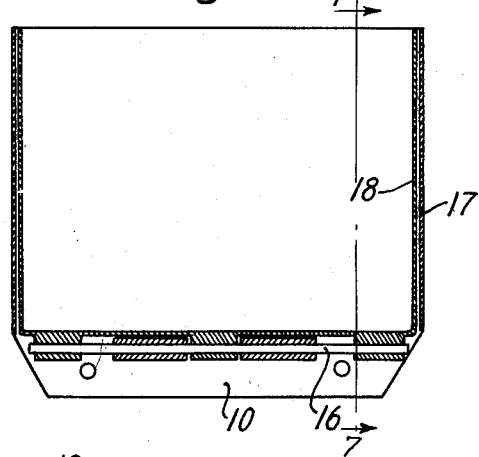
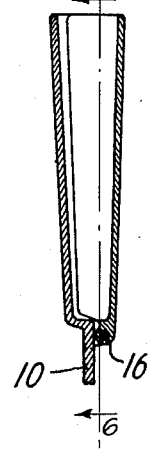
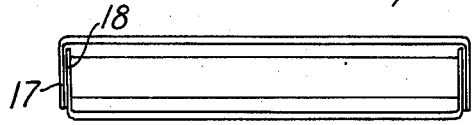
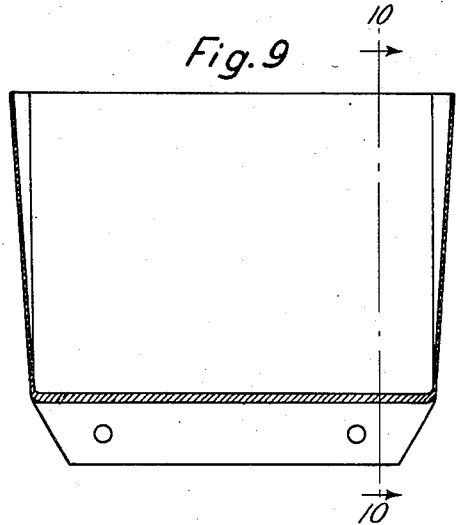
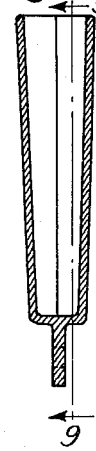
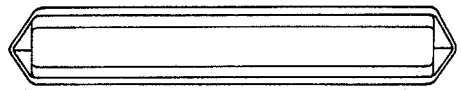
INVENTOR
T. W. Tharaldsen
By Watson, Cole, Grindle
& Watson Patented Nov. 21, 1950

2,531,087

UNITED STATES PATENT OFFICE 2,531,087

FREEZING APPARATUS

Tharald Warberg Tharaldsen, Drammen, Norway

Application March 27, 1947, Serial No. 737,541
In Norway November 28, 1945

3 Claims. (Cl. 62—114)

This invention relates to freezing apparatus of the type wherein the goods are frozen in containers having heat conductive walls.

Previously known apparatus of this type have the disadvantage that the heat transferring surfaces (evaporating surfaces), which extract the heat from the goods, are apt to be covered by an inconvenient coating of frost rime or ice which increases the temperature difference between the frozen product and the cooling medium, and thereby has a detrimental effect upon the freezing capacity of the apparatus.

According to the present invention this drawback is overcome in that the containers are carried through the freezing zone with their heat conductive surfaces in intimate contact with the heat transferring surfaces (the evaporating surfaces). These surfaces may be the surfaces of bodies provided with cavities or in which tubes carrying the cooling medium are incorporated, or the surface of a plate which is cooled by a cold air flow, or by being sprayed with a cold liquid or in some other manner. Due to the fact that the containers with the freezing goods are carried along in this manner with their walls in frictional contact with the heat transferring surfaces, an obstructive formation of rime on these surfaces is prevented.

In order to maintain the contact between the container walls and the evaporating surfaces the containers may, according to the invention, be so made that the contact surfaces of the containers form comparatively acute angles to each other. The containers may be made in a wedge-like form with their smaller ends pointing downwards during the freezing process, and the evaporating surfaces may be arranged so as to form the same angle or angles. When the apparatus is so arranged that the weight of the containers and their contents is wholly or partly transferred to the evaporating surfaces, which are placed in wedge-like formation relatively to each other, a very intimate contact may be obtained with the heat transferring surfaces. The surfaces may also be kept clean in various ways, for instance by means of special scrapers, the desired result being that they must be easily kept clean.

The containers may be conveyed over the heat transferring surfaces by means of a rod, an endless chain or the like.

The containers may be connected to such conveyor means in such a manner that they are automatically slightly lifted when the resistance to the movement increases, whereby the pressure between the container walls and the heat transferring surfaces decreases, whereas the containers are, on the other hand, slightly lowered when the resistance to the movement decreases. This arrangement also enables the freezing of the goods to be effected partly when the containers are at rest and partly during the movement of the same, the containers being adapted to disconnect themselves when the conveyor means is started even if they are frozen on to the evaporating surfaces during such halting periods.

The disconnection of the containers or a reduction of the resistance, where this is required during the movement of the containers, may also be obtained by arranging that the distance between the heat transferring surfaces is somewhat increased, contingently thereby that the surfaces are held against the side walls of the containers by means of springs, and that they are, at the same time, moved somewhat in the same direction as the freezing goods.

The containers may be so made that the heat conductive walls of the same are hinged on to the bottom or in other manner yieldingly connected thereto so that the angle between the side walls may be varied and the containers completely opened if desired. The heat conductive walls may conveniently be made more rigid than the end walls which may be somewhat flexible, e. g. they may be thinner and somewhat curved or bent at an angle. End walls of this type may also consist of flanges which are bent at an angle to the side walls or in some other manner are connected thereto and are so arranged as to overlap each other and/or to be slidable, one on the other.

Figure 5:
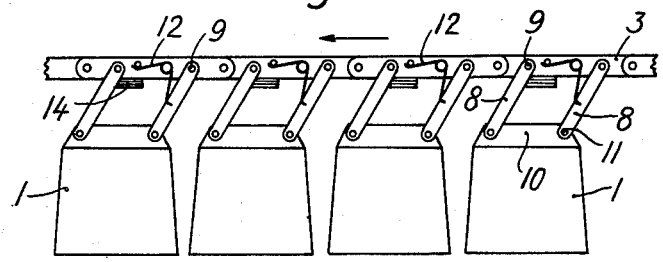
Figure 4:
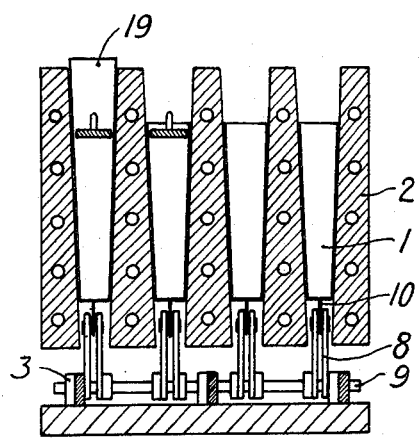

Other features of the invention will appear from the following description with reference to the accompanying drawings. In the drawing, Figure 1 is a vertical longitudinal section of the freezing apparatus on line 2—2 of Figure 1 and Figure 2 a cross section of the same. Figure 3 shows on a larger scale the containers and the connecting means between the same and the driving chain. Figure 4 shows the same in a sectional view on line 4—4 of Figure 3, and Figure 5 shows the containers in position for emptying. Figures 6, 7 and 8 show a container in longitudinal and cross sections and as seen from above, respectively, and Figures 9, 10 and 11 are similar views of a container of another form.

In Figures 1 and 2, 1 indicates the containers, 2 the heat transferring surfaces (the "evaporator") and 3 the endless chain for the transport of the containers. The chain is driven by the arm crosses 4 and 5 in the direction indicated by an arrow. As will be apparent from Figure 2, the apparatus is provided with six rows of containers which are carried along in the spaces between seven spaced "evaporators." The containers are in the form of prisms of trapezoidal, wedge-shaped cross section and the "evaporators" are so formed that the spaces between them are of corresponding cross section, so that each container bears against an "evaporator" on both sides.

When the containers have passed the "evaporators" and the goods are frozen, the containers are swung down and are carried by the lower portion of the chain between heating plates 6 for the disconnection of the frozen goods from the containers so that they be removed through the door 7 in the bottom of the insulating housing which encloses the whole apparatus.

The portions of the products adjacent to the walls of the containers will have the lowest temperature when the containers leave the evaporator surfaces. These same portions have to be thawed in order to remove the products from the apparatus. An additional after-freezing of the inner layers of the products is therefore obtained if the product is given the opportunity of remaining in the frozen and unthawed condition after the cessation of the freezing process proper, so that the temperatures throughout the frozen goods and container may become approximately uniform prior to the partial thawing process for the removal of the frozen goods.

This removal is achieved by effecting the emptying of the containers at a certain distance from the evaporator surfaces. On the other hand it is of importance that the containers are cooled after the removal of the product so that they are at the lowest possible temperature when they are re-charged. For this purpose further cooling surfaces are used other than those used for the contact freezing proper. There may either be used a "quiet" cooling, e. g., by means of cooling surfaces as shown by 22, or an air cooler 21 with a fan 20. If such cooling surfaces are kept at a sufficiently low temperature, preferably lower than that of the evaporator surfaces 2, then the first result obtained is that the containers are thoroughly under-cooled prior to charging, and the second that the moisture of the air is more easily deposited on these cooling surfaces 21 and 22 than on the evaporator surfaces 2, whereby the de-riming operations are simplified, especially when more sets of cooling surfaces are used so that one set may be de-rimed when the other is in use.

In view of the fact that heat is introduced into the apparatus during the emptying process, the zone wherein the emptying is carried out should be insulated from the remaining portions of the apparatus. The emptying zone should also, as mentioned above, be so arranged that the most favourable conditions are achieved firstly with a view to the temperature equalization throughout the frozen goods, and secondly to the pre-cooling of the containers.

The heating members 6 may, in similarity to the freezing members 2, be cast plates with incorporated tubes for carrying the heating medium.

The connection between the containers 1 and the conveyor chain 3 is effected as shown in Figures 3 to 5 by means of links 8 of which there are two pairs for each container and which are connected to the chain by pivots 9 and to the container or to a flange 10 projecting from the bottom thereof by the pivots 11. These links lie at acute angles to the chain in the direction of movement of the same, so that the links, when the containers are moved forward will always have an upwardly directed component of pressure onto the containers which therefore counteracts their weight. At the normal pressure between the container walls and the heat transferring surfaces these forces will counterbalance each other, but if the resistance to the movement of the containers is increased, the upwardly directed component will be increased to the effect that the containers are lifted.

Between one of the links 8 and one of the links of the chain there may be provided an adjustable spring 12 which keeps the container raised to a sufficient height until it arrives in between the heat transferring surfaces, the container being at the same time charged with goods for freezing through the door 13. The chain may also be provided with abutments 14 against which one of the links in each pair abuts when the container is hanging in the lower part of the chain, thereby ensuring that the correct angle of the links 8 relative to the chain is always maintained.

The container shown in Figures 6 to 8 is so made that one of the side walls is hinged on to the bottom by hinges and pivots 16, and the end walls are made in the form of flanges 17 and 18 which are bent from the side walls of the containers or connected to the same in another manner, and arranged adjacent to each other so as to allow a diverging movement of the side walls relative to each other.

In the container shown in Figures 9 to 11, the end walls are bent angularly so as to be slightly flexible and thereby allow a change in the relative mutual position of the side walls.

Each container or some of them may be provided with a scraper 19 or the like in a continuation of the end wall for the purpose of cleaning the heat transferring of evaporating surfaces of the apparatus.

The apparatus according to the invention may be conveniently arranged for intermittent movement of the containers, so that for the purpose of a quick freezing they are at first stopped between the heat transferring surfaces and then, for the purpose of equalising the temperature throughout the frozen goods, in a zone between these surfaces and the heating surfaces, then again between these heating surfaces for the disconnection of the goods and removal from the containers, and then finally in the zone of the apparatus wherein the containers are cooled prior to the re-charging.

I claim:

1. An apparatus for freezing food products in containers of heat conductive material, comprising spaced plane refrigerating surfaces and conveying means for conveying the said containers between the said refrigerating surfaces with their side walls in sliding contact with the surfaces, the conveying means comprising an endless chain to which each container is connected by means of substantially parallel links which by one end are pivotally mounted on the chain and by the other end pivotally attached to the container, and which lie at an acute angle to the chain in the direction of movement of the same so that the links upon increasing resistance against the movement of the container apply a pressure component to the same directed outwardly from the chain.

2. An apparatus as claimed in claim 1, wherein spring means are provided in connection with the said links, tending to increase the outwardly directed pressure component on the container.

3. An apparatus for freezing food products in containers of heat conductive material, comprising spaced plane refrigerating surfaces and conveying means for conveying the said containers between the said refrigerating surfaces with their side walls in sliding contact with the surfaces, the containers having a wedge shaped cross section with its apex directed against the conveyor means, and the refrigerating surfaces being disposed at the same angles as the side walls of the containers, so that the contact pressure between the said container walls and the refrigerating surfaces may be increased by a wedging action of the container between the said surfaces.

THARALD WARBERG THARALDSEN.

REFERENCES CITED

The following references are of record in the file of this patent:

UNITED STATES PATENTS

| Number | Name | Date |
|---|---|---|
| 1,847,956 | Giger | Mar. 1, 1932 |
| 1,932,887 | Giger | Oct. 31, 1933 |
| 1,998,431 | Birdseye | Apr. 23, 1935 |
| 2,215,486 | Stone | Sept. 24, 1940 |
| 2,268,551 | McMatton | Jan. 6, 1942 |

FOREIGN PATENTS

| Number | Country | Date |
|---|---|---|
| 430,082 | Great Britain | June 7, 1935 |